United States Patent [19]

Jones

[11] Patent Number: 4,561,575

[45] Date of Patent: Dec. 31, 1985

[54] SWING AWAY TIRE CARRIER AND HITCH

[76] Inventor: Robert R. Jones, c/o Russell Bartling 1335 W. 12th St., Fremont, Nebr. 68025

[21] Appl. No.: 568,116

[22] Filed: Jan. 4, 1984

[51] Int. Cl.⁴ .............................................. B62D 43/02
[52] U.S. Cl. .............................. 224/42.21; 224/42.06; 296/37.2; 414/462
[58] Field of Search ............... 224/42.12, 42.21, 42.06, 224/42.24, 42.28, 423; 414/462–466; 296/37.2; 211/23

[56] References Cited

U.S. PATENT DOCUMENTS

| | | | |
|---|---|---|---|
| 1,419,965 | 6/1922 | Gerrie | 414/464 |
| 3,039,634 | 6/1962 | Hobson et al. | 224/42.03 R X |
| 3,669,326 | 6/1972 | Podraza | 224/42.21 |
| 3,700,130 | 10/1972 | Holdread | 414/466 |
| 3,753,520 | 8/1973 | Bodde | 224/42.21 X |
| 3,804,308 | 4/1974 | Bodde | 224/42.21 X |
| 4,155,472 | 5/1979 | Dansbury | 224/42.21 X |
| 4,234,284 | 11/1980 | Hauff | 224/282 X |
| 4,381,069 | 4/1983 | Kreck | 224/42.03 R X |

Primary Examiner—Stephen Marcus
Assistant Examiner—Robert Petrik
Attorney, Agent, or Firm—Harvey B. Jacobson

[57] ABSTRACT

A mount is provided for secure mounting on one end of a vehicle and an elongated arm has a first end thereof provided with support structure for supporting a vehicle wheel therefrom with the medial plan of the wheel generally paralleling the arm. Mounting structure is also provided for mounting the second end of the arm from the mount for angular displacement relative thereto about a first horizontal axis generally normal to the aforementioned plane between a raised upright position with the first end of the arm uppermost and a generally horizontal position with the arm first end swung downwardly to a horizontal position. The mounting structure also mounts the second arm end for swinging relative to the mount about an upright axis, whereby the wheel supporting arm may first be swung across the associated vehicle end from an upright position to a horizontal position and then may be swung outwardly from the corresponding vehicle end.

11 Claims, 15 Drawing Figures

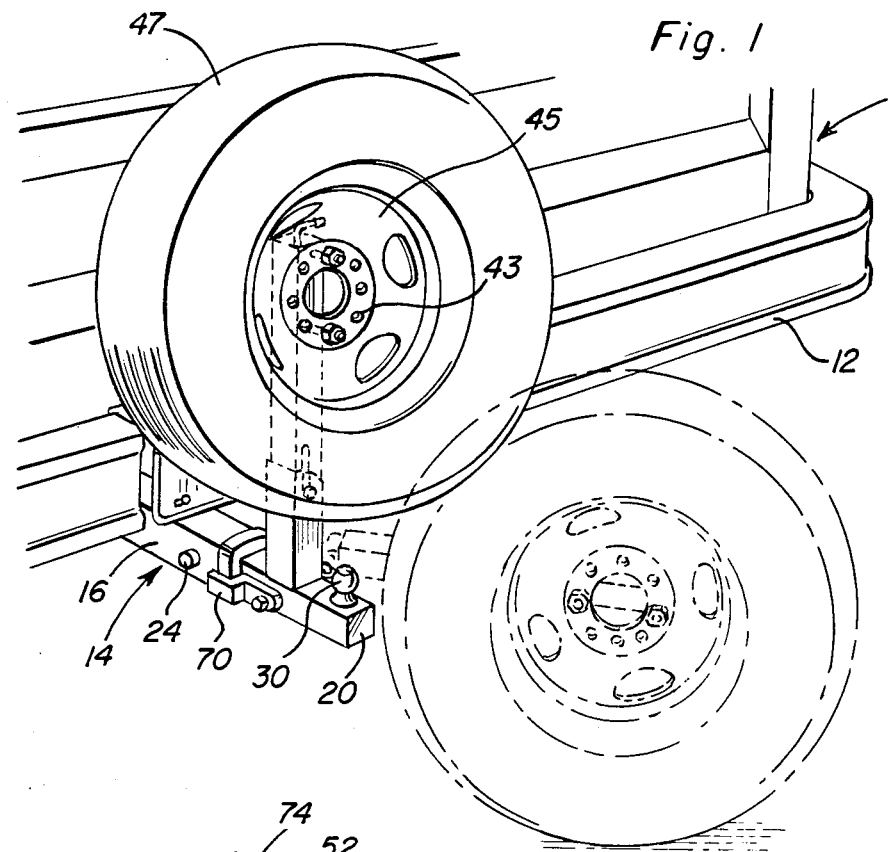
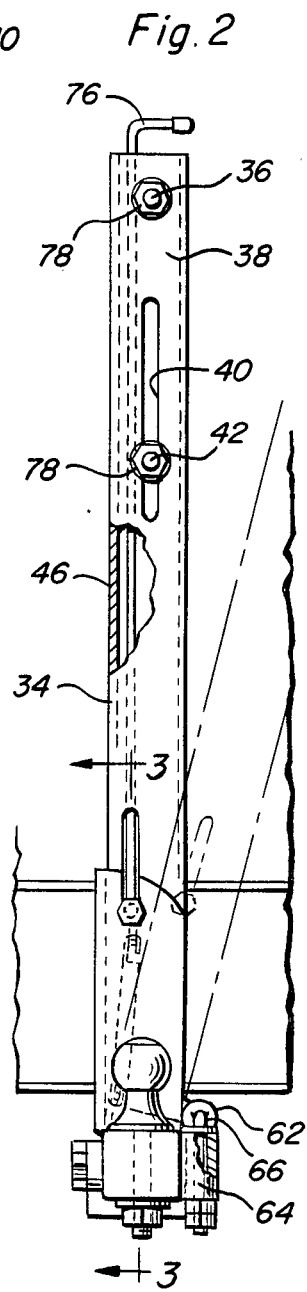
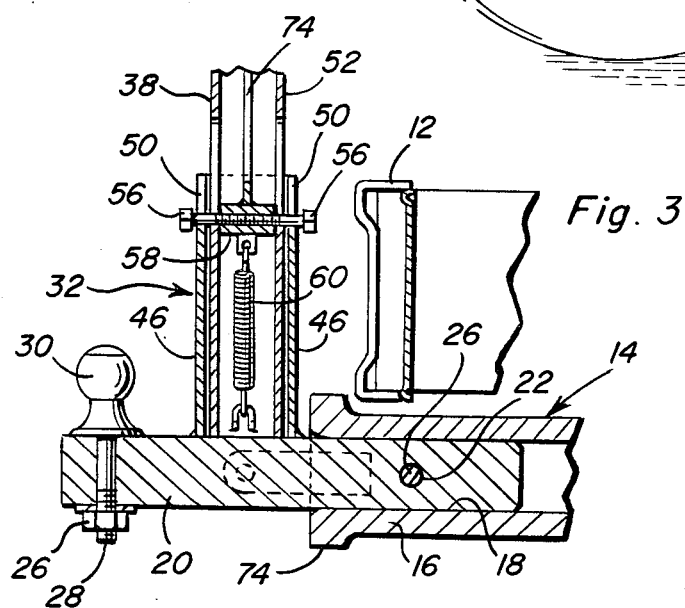
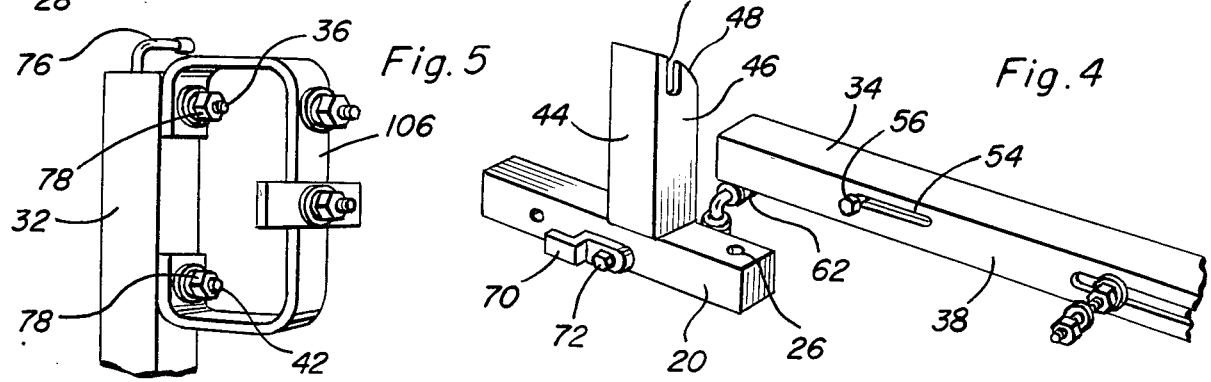

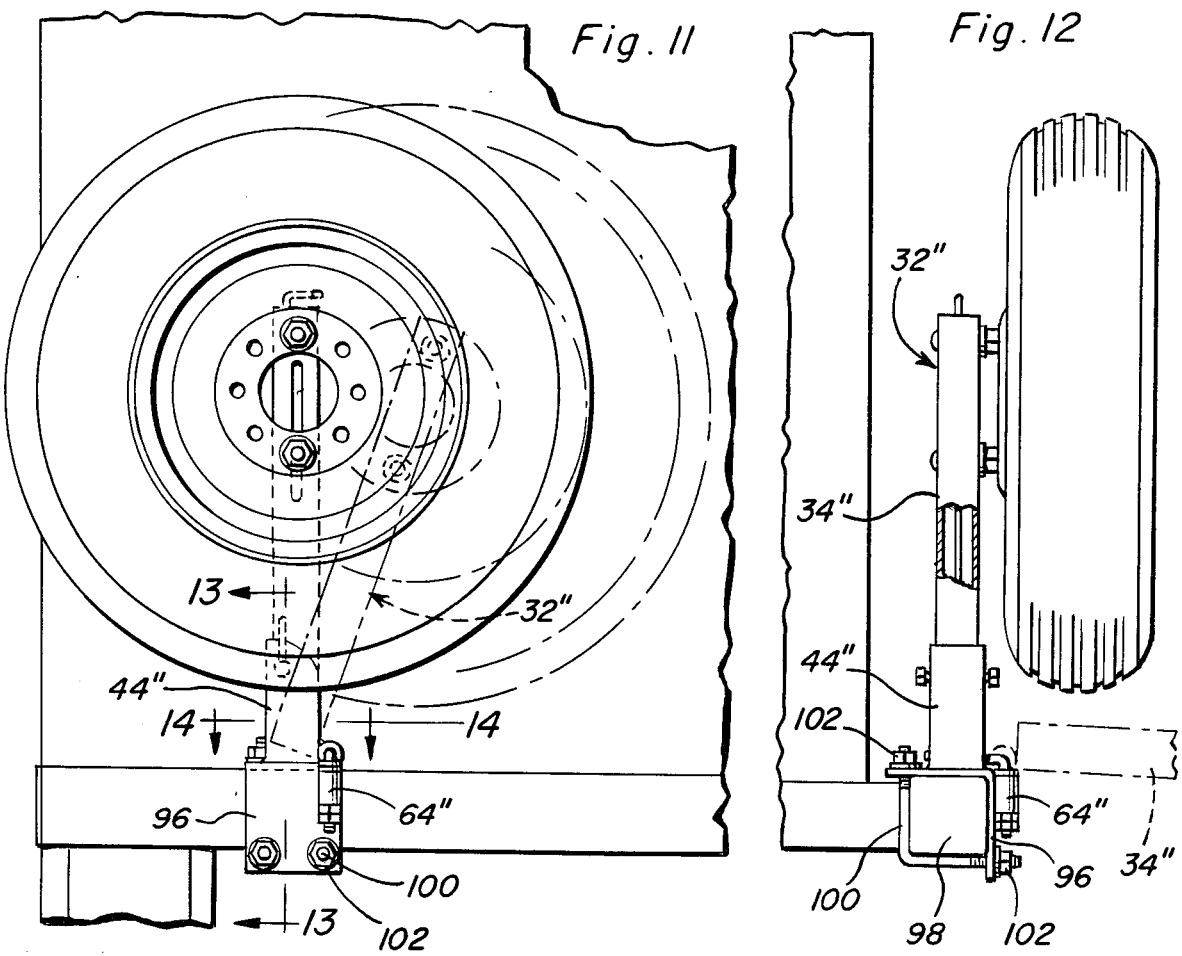
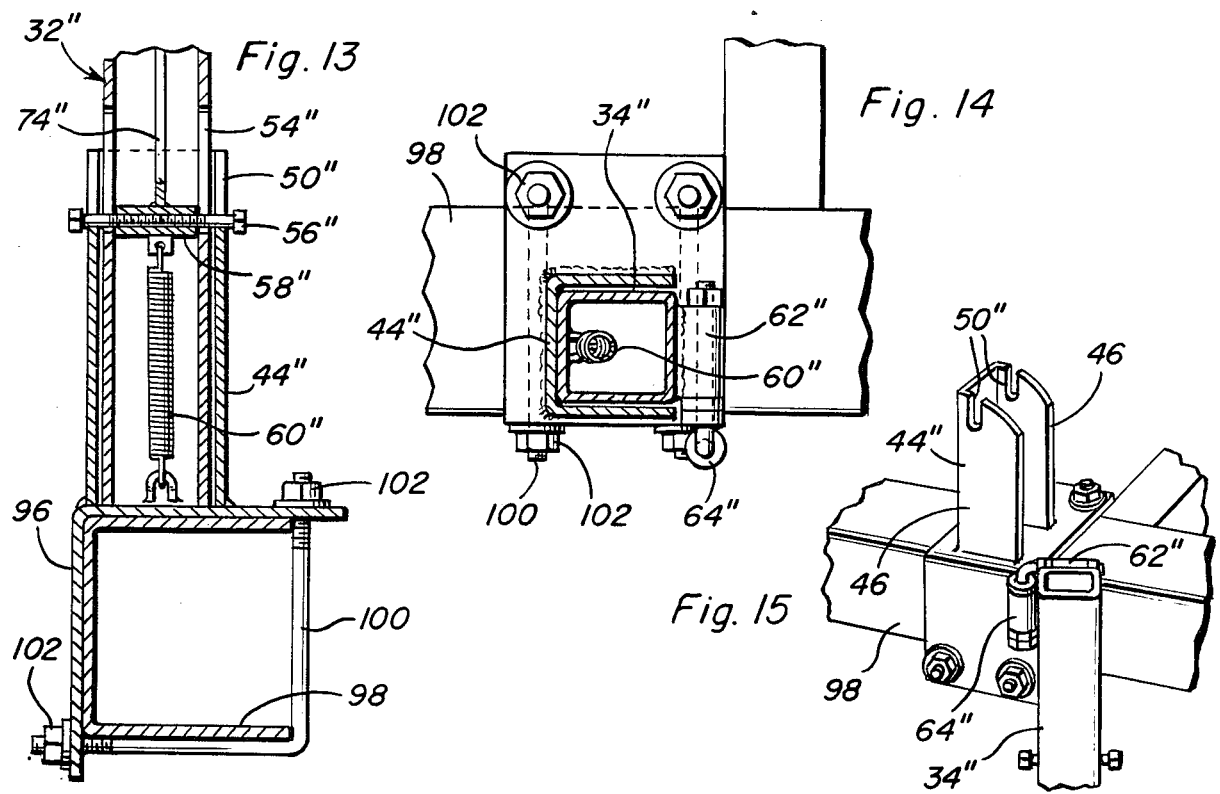

SWING AWAY TIRE CARRIER AND HITCH

BACKGROUND OF THE INVENTION

Various different forms of tire mounts heretofore have been provided for mounting a spare wheel and tire on either end of a vehicle.

Some vehicles which use exterior mounted spare tires comprise heavy duty vehicles such as mobile homes and spare wheel and tire assemblies of heavy duty vehicles of this type are difficult to handle when it becomes necessary to change a tire and wheel assembly.

Accordingly, a need exists for a spare wheel and tire assembly support for exterior mounting of a spare wheel and tire assembly and constructed in a manner whereby the spare wheel and tire assembly supported therefrom may be readily dismounted from the associated vehicle and exchanged for the wheel and tire assembly to be replaced.

Further, with exterior mounted spare wheels and tires there is always a problem of theft. Therefore, there is an additional need to provide a spare wheel and tire assembly support for mounting a spare tire and wheel assembly on the exterior of a vehicle in a manner such that the entire spare tire mount as well as the spare wheel and tire assembly supported therefrom may be readily removed from an associated vehicle for storage when that vehicle is not in use.

Examples of various different forms of spare tire assemblies including some of the general structural and operational features of the instant invention are disclosed in U.S. Pat. Nos. 2,674,393, 3,343,736, 3,648,867, 3,669,326, 3,700,130, 3,753,520, 3,822,814 and 3,853,255.

BRIEF DESCRIPTION OF THE INVENTION

The swing away tire carrier and hitch of the instant invention provides structure whereby a heavy spare wheel and tire assembly may be conveniently supported on the exterior of a vehicle from one end thereof and with the spare wheel and tire assembly being readily swingable to a position contacting the ground before removal of the spare wheel and tire assembly from the carrier. In addition, the tire carrier is also constructed in a manner whereby a spare wheel and tire assembly to be mounted thereon may be readily held in position for support from the tire carrier prior to the carrier being swung to a operational position and all but one of the disclosed forms of the tire carrier are constructed in a manner whereby they may be supported from a conventional removable trailer hitch component, thereby enabling the spare tire carrier as well as the spare wheel and tire assembly supported therefrom to be removed from the associated vehicle when it is not in use.

The single form of the disclosed invention which is not operatively associated with a removable trailer hitch component includes a simple bumper mount and may therefore be used in conjunction with various different forms of bumper equipped vehicles. However, the bumper mounted form of the invention is also constructed in a manner enabling at least reasonably ready removal from the associated vehicle.

The main object of this invention is to provide a spare wheel and tire mount including structural and operational features thereof which greatly facilitate removal of a spare wheel and tire assembly therefrom as well as the mounting of a spare wheel and tire assembly thereon.

Another object of this invention is to provide a spare tire carrier operatively associated with a removable trailer hitch component in a manner such that the trailer hitch component and spare tire carrier as well as a spare wheel and tire assembly supported therefrom may be readily removed from the associated vehicle.

Yet another important object of this invention is to provide a spare tire carrier which may be placed in use in conjunction with a vehicle equipped with a heavy duty trailer hitch of the type providing a rearwardly opening socket for the reception of a towing hitch component without any modification being made to the vehicle.

A final object of this invention to be specifically enumerated herein is to provide a tire carrier in accordance with the preceding objects and which will conform to conventional forms of manufacture, be of simple construction and easy to use so as to provide a device that will be economically feasible, long lasting and relatively trouble free in operation.

These together with other objects and advantages which will become subsequently apparent reside in the details of construction and operation as more fully hereinafter described and claimed, reference being had to the accompanying drawings forming part hereof, wherein like numerals refer to like parts throughout.

BRIEF DESCRIPTION OF THE DRAWINGS

FIG. 1 is a fragmentary perspective view of the rear end of a vehicle with which the tire carrier of the instant invention is operably associated and with a wheel and tire assembly demounting position of the tire carrier being illustrated in phantom lines;

FIG. 2 is an enlarged rear elevational view of the tow hitch mounted tire carrier with portions thereof being broken away and illustrated in vertical section, the associated wheel and tire assembly removed and an alternate position of the support arm of the carrier illustrated in phantom lines;

FIG. 3 is a fragmentary vertical sectional view taken substantially upon the plane indicated by the section line 3—3 of FIG. 2;

FIG. 4 is a fragmentary perspective view of the spare tire carrier with the support arm portion thereof in a wheel and spare tire demounting position;

FIG. 5 is a fragmentary perspective view of the upper end portion of a modified form of spare tire support arm illustrating an alternate spare wheel and tire assembly mount;

FIG. 11 is a fragmentary rear elevational view illustrating a second modified form of tire carrier;

FIG. 12 is a fragmentary side elevational view of the assemblage illustrated in FIG. 11;

FIG. 13 is an enlarged fragmentary vertical sectional view taken substantially upon the plane indicated by the section line 13—13 of FIG. 11;

FIG. 14 is an enlarged fragmentary horizontal sectional view taken substantially upon the plane indicated by the section line 14—14 of FIG. 11; and FIG. 15 is a fragmentary perspective view of the second modified form of tire carrier with the wheel and tire assemblies support arm thereof swung downwardly and outwardly from its transit position.

DETAILED DESCRIPTION OF THE INVENTION

Figure 6:
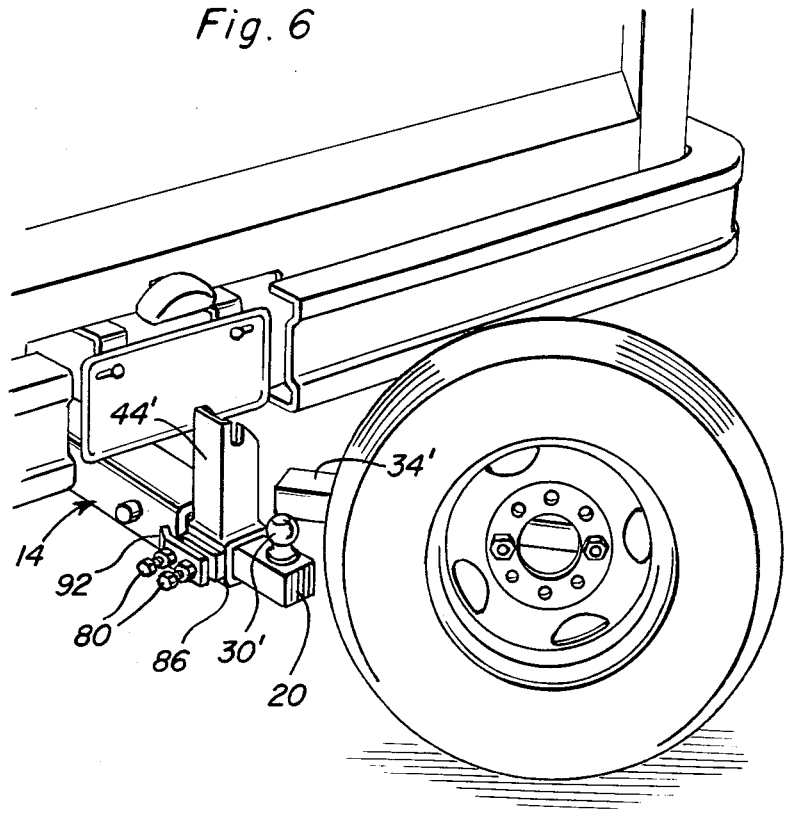
FIG. 6 is a fragmentary perspective view similar to FIG. 1 but illustrating a slightly modified form of spare tire carrier and with the support arm portion thereof in a spare wheel and tire assembly demounting position.

Referring now more specifically to FIGS. 1–5 of the drawings, the numeral 10 generally designates a vehicle including a rear bumper 12 and a heavy duty trailer hitch referred to in general by the reference numeral 14. The trailer hitch 14 is of the type including a rigidly mounted, heavy duty and horizontally disposed socket member 16 defining a socket 18 opening endwise outwardly of the bumper 12 below the latter. Conventionally, a heavy duty elongated hitch bar 20 is provided and includes a transverse bore 22 formed through one end registrable with aligned transverse bores 24 formed in opposite side portions of the socket member 16. In addition, a transverse pin 26 is provided and may be passed through the bores 22 and 24 to releasably retain the hitch bar 20 within the socket member 16. The hitch bar 20 includes an outer end remote from the transverse bore 22 having a vertical bore 26 formed therethrough and the shank 28 of a hitch ball 30 is secured through the bore 26 for securing the hitch ball 30 to the hitch bar 20.

The foregoing may be considered as conventional structure.

A first form of tire carrier of the instant invention is referred to in general by the reference numeral 32 and comprises an integral part of the hitch bar 20. The tire carrier 32 includes an elongated upstanding tubular support arm 34 having a first stationary threaded stud 36 projecting outwardly of the rear wall 38 of the support arm 34 adjacent the upper end thereof and the rear wall 38 additionally includes a longitudinal slot 40 formed therein below the stud 36 and in which the forward end of a second threaded stud 42 is adjustably slidably secured. The studs 36 and 42 may be received through selected hub mounting bolt holes 43 formed through the center hub portion of a wheel 45 having a spare tire 47 mounted thereon in order to mount the wheel 45 from the support arm 34.

An upstanding stationary tubular mount 44 is provided and solidly and permanently attached to the hitch bar 20. One side of the tubular mount 44 is omitted to define an open side and the mount is disposed in upstanding relation and projects upwardly from the hitch bar 20. Corresponding upper corner portions of the front and rear walls 46 of the tubular mount 44 are rounded as at 48 and the rounded corner portions include registered upwardly opening vertical slots 50 formed therein. The lower end of the front wall 52 and the lower end of the rear wall 38 of the support arm 34 include registered longitudinal slots through which the headed end portions of a pair of threaded bolts 56 are slidingly received. The threaded bolts 56 are threaded into the opposite ends of an internally threaded sleeve 58 slidable in the support arm 34 and the sleeve 58 is yieldingly biased toward the lower ends of the slots 54 by an expansion spring 60 connected between the sleeve 58 and anchored relatively to the lower end of the support arm 34. The support arm 34 mounts a lower end transverse sleeve 62 on its right sidewall and the hitch bar 20 mounts a vertical sleeve 64 on the right side thereof, see FIG. 2. Opposite ends portions of a right angle or L-shaped pivot pin 66 are journalled in the sleeves 62 and 64 and the base end of the support arm 34 therefore pivotally connected to the hitch bar 20 for oscillation relative thereto about a vertical axis as well as a horizontal axis extending transversely of the lower end of the support arm 34. In this manner, the support arm 34 may be swung between the lowered position thereof illustrated in FIG. 4 and the raised operative position thereof illustrated in FIG. 2.

The hitch bar 20 also includes a Z-shaped clamp strap 70 removably mounted thereon by a threaded fastener 72 and the clamp strap, when fastener 72 is tightened, engages the transversely thickened and outwardly flaring rear end 74 of the socket member 16 in order to clamp the hitch bar 20 against rattling within the socket 18.

As the support arm 34 is swung from the lowered position thereof illustrated in solid lines in FIG. 4 toward the upstanding position illustrated in FIG. 2, the headed ends of the bolts 56 engage the rounded corner portions 46 in order to cam the bolts 56 upwardly along the slots 54 against the biasing action of the spring 60. Then, as the support arm 34 reaches the upright position thereof illustrated in FIG. 2, the bolts 56 will be registered with the slots 50 and the spring 60 will draw the bolts 56 down into the slots 50 and thereby lock the support arm 34 in the upright position thereof illustrated in FIG. 2 of the drawings. The sleeve 58 also has the lower end of a vertical pull rod 74 anchored relative thereto and the upper end of the pull rod includes a horizontal laterally directed upper end portion 76 defining a handle by which manual upward pressure may be conveniently applied to the rod 74. Sufficient upward manual pressure on the rod 74 will upwardly displace the sleeve 58 against the biasing action of the spring 60 and thus upwardly retract the bolts 56 from the upper ends of the slots 50. Then, the support arm 34 may be swung from the upright solid line position thereof illustrated in FIG. 2 of the drawings through the phantom line position thereof illustrated in FIG. 2 toward the lowered position illustrated in FIG. 4. When the support arm 34 has been swung to the lowered position thereof and outwardly from the bumper 12, the spare tire 48 supported therefrom will contact the ground and be supported therefrom. Then, the attaching bolts 78 threaded on the studs 36 and 42 in order to retain the wheel 46 on the support arm 34 may be loosened so that the wheel 46 may be removed.

It will be noted that inasmuch as the hitch bar 20 is removably supported from the socket member 16, not only hitch bar and the hitch ball 30 supported therefrom but also the tire carrier 32 may be readily totally removed from the vehicle 10.

Figure 8:
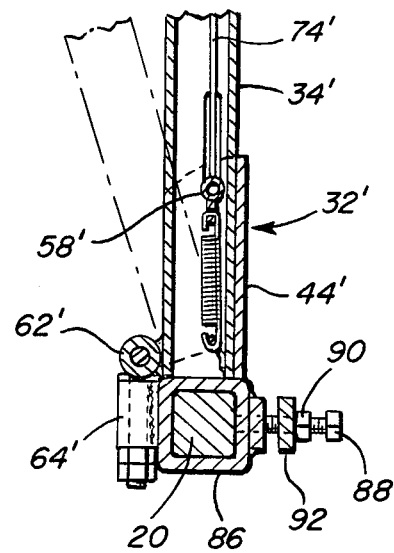
FIG. 8 is an enlarged fragmentary vertical sectional view taken substantially upon the plane indicated by the section line 8—8 of FIG. 7.
Figure 9:
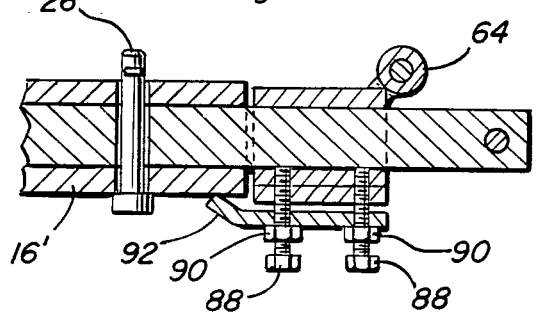
FIG. 9 is a fragmentary enlarged horizontal sectional view taken substantially upon the plane indicated by the section line 9—9 of FIG. 7.
Figure 10:
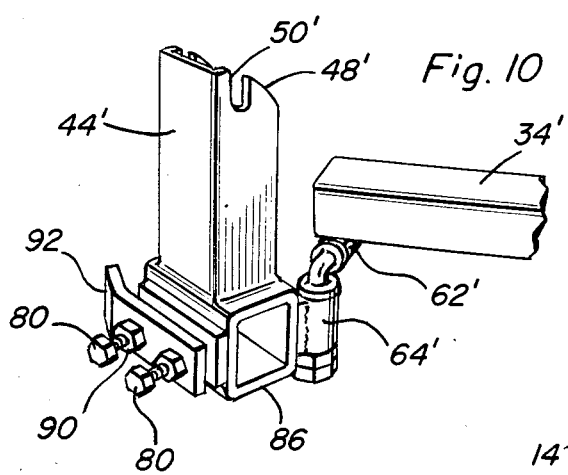
FIG. 10 is a fragmentary enlarged perspective view similar to FIG. 4 illustrating the modified form of tire carrier illustrated in FIGS. 6-9.
Figure 7:
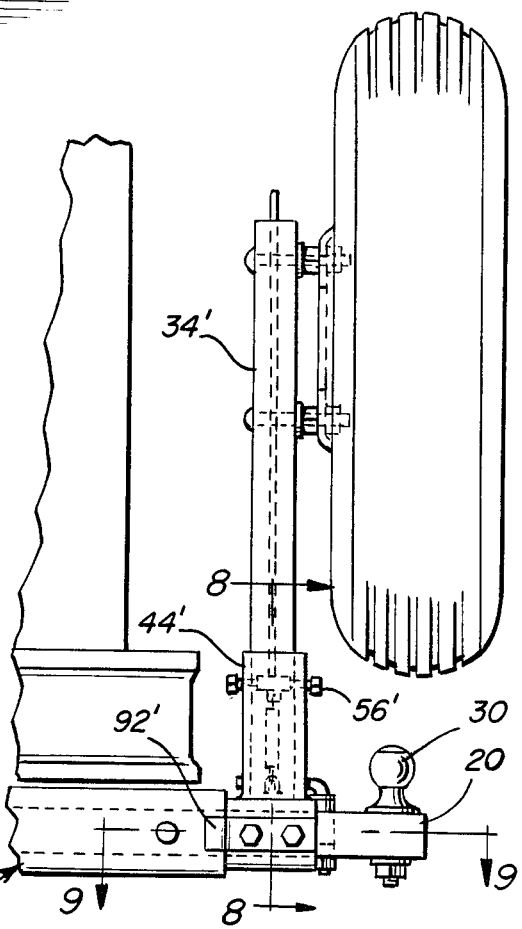
FIG. 7 is a fragmentary side elevational view of the assemblage illustrated in FIG. 6, but with the support arm portion of the carrier in an upright wheel and tire assembly transit position.

With attention now invited more specifically to FIGS. 6–9 of the drawings, a modified form of tire carried is referred to in general by the reference numeral 32'. The tire carrier 32' is substantially identical to the tire carrier 32, except that the tubular member 44' thereof corresponding to the tubular member 44 is mounted upon a thick walled sleeve 86 telescoped over the hitch bar 20 and adjustably secured in position thereon by set screws 80 having clamp nuts 90 threadedly engaged therewith and operatively associated with a clamp plate 92 corresponding to the clamp strap 70. Otherwise, all of the components of the tire carrier 32' are similar to the corresponding components of the tire carrier 32 and are designated by prime reference numerals corresponding to the reference numerals designating the various parts of the tire carrier 32. In addition, the tire carrier 32 is utilized in conjunction with a tow hitch 14' which is similar to the tow hitch 14 but does not include the thickened and flared open end of the socket member 16' thereof corresponding to the thickened and flared rear end 74 of the socket member 16.

With reference now more specifically to FIGS. 11–15 of the drawings, a third form of tire carrier is referred to in general by the reference numeral 32". The difference between the tire carrier 32" and the tire carriers 32 and 32' is that the lower end of the tubular member 44" of the tire carrier 32" is welded to an angle bracket 96 releasably clampingly engaged with a rectangular vehicle bumper 98 by right angulated threaded shanks 100 and associated nuts 102. The bracket 96 is provided with openings through which the threaded ends of the shanks 100 are secured by the nuts 102. Otherwise, all other components of the tire carrier 32' are identical to the various components of the tire carrier 32 and are designated by corresponding prime reference numerals.

Either of the tire carriers 32, 32' and 32" may be mounted on either the rear end of a vehicle or the front end thereof, as long as the associated vehicle includes a tow hitch on the vehicle end to which either the tire carrier 32 or the tire carrier 32' is to mounted and the vehicle upon which the tire carrier 32' is to be mounted includes a rectangular bumper. As hereinbefore set forth, either of the tire carriers 32 and 32' may be readily totally disengaged from the associated vehicle and removal of the four nuts 102 allows the tire carrier 32' to be totally removed from the associated vehicle. The clamp strap 70 and clamp plate 92 serve to assure that the associated hitch bars 20 and 20' do not rattle within the respective socket members.

Also, by mounting the hitch balls 30 and 30' rearward of the associated tire carriers 32 and 32', interference between the tire carriers and trailers coupled to the respective hitch bars is avoided. Still further, inasmuch as most trailer tongues are relatively narrow at the forward ends thereof, the spare wheel and tire assembly supported from either the tire carrier 30 or the tire carrier 32' may be operated to swing the associated wheel and tire to the ground in the manner illustrated in phantom lines in FIG. 1 and in solid lines in FIG. 6 without interference with an associated trailer.

FIG. 5 illustrates a C-shaped bracket 106 secured to the support arm 32 by the studs 36, 42 and nuts 78 and which in turn includes nut equipped studs 108 and 110 for mounting a wheel having an offset hub on the support arm 32.

The foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed as new is as follows:

1. In combination with a vehicle including a generally straight marginal portion, an upstanding open side sleeve stationarily mounted from said vehicle outwardly of said marginal portion and opening laterally along said marginal portion, an upstanding arm including a first upper end and a second lower end snugly laterally received in said sleeve in a stored position therewithin, the upper end of said arm projecting above said sleeve and including means for supporting a vehicle wheel therefrom with the medial plane of said wheel generally paralleling said marginal portion, and dual pivot axis support means mounting the lower end of said arm for successive swinging, only, relative to said sleeve about a first axis disposed normal to said plane from said stored position to a horizontally outwardly projecting horizontal position generally paralleling said marginal portion and with said lower end angularly displaced completely outwardly of the open side of said sleeve and then about a second upstanding axis disposed outward of the confines of said sleeve to swing said first end horizontally outwardly from said vehicle marginal portion.

2. The combination of claim 1 including coacting latch means carried by said arm and sleeve releasably retaining said arm in said stored position.

3. The tire carrier of claim 1 including trailer tow hitch means carried by said mount on a portion thereof horizontally spaced from said other end of said arm and said mounting means and disposition outwardly from said one end of said vehicle from said arm other end and mounting means.

4. The tire carrier of claim 3 wherein said mount includes an elongated horizontal bar having a first end portion for telescopic securement in an outwardly opening hitch socket member carried by said one vehicle end and a second end portion from which said trailer tow hitch means is supported, said other end of said arm and mounting means being disposed intermediate said first and second end portions of said bar.

5. The tire carrier of claim 1 wherein said mount includes means for mounting upon a vehicle bumper.

6. The tire carrier of claim 1 wherein said mount includes means for mounting upon a vehicle bumper.

7. The tire carrier of claim 1 wherein said mount includes an elongated hitch bar for removable telescopic engagement of one end portion thereof in an outwardly opening socket member provided therefor on said vehicle.

8. The tire carrier of claim 7 wherein said upstanding open sided sleeve has its lower end portion permanently attached to said hitch bar.

9. The tire carrier of claim 7 wherein the lower end of said open sided sleeve is mounted from a horizontal sleeve through which said one end portion of said hitch bar is removably telescopically mounted.

10. The tire carrier of claim 1 wherein said mounting means includes an L-shaped pivot mount defining right angulated pivot shanks, one of said pivot shanks being supported from said sleeve for oscillation about said vertical axis and said other end of said arm being oscillatable relative to the other of said pivot shanks with the latter extending transversely of said arm.

11. The tire carrier of claim 1 including latch means operatively connected between said open sided sleeve and said arm operative to releasably latch said arm in said raised upright position.

* * * * *